United States Patent
Saur

(10) Patent No.: US 7,591,324 B2
(45) Date of Patent: Sep. 22, 2009

(54) CLUTCH DEVICE FOR AN ELECTRIC MACHINE TOOL AND AN ELECTRIC MACHINE TOOL

(75) Inventor: Dietmar Saur, Gomaringen (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 11/497,896

(22) Filed: Aug. 2, 2006

(65) Prior Publication Data

US 2007/0193756 A1  Aug. 23, 2007

(30) Foreign Application Priority Data

Aug. 4, 2005  (DE) .................. 10 2005 036 731

(51) Int. Cl.
 *B25D 16/00* (2006.01)
(52) U.S. Cl. .................. 173/48; 173/47; 173/104; 173/217; 173/176
(58) Field of Classification Search ............ 173/47, 173/48, 217, 176, 104
See application file for complete search history.

(56) References Cited

U.S. PATENT DOCUMENTS

| | | | | |
|---|---|---|---|---|
| 4,719,976 A | * | 1/1988 | Bleicher et al. | 173/109 |
| 4,732,217 A | * | 3/1988 | Bleicher et al. | 173/104 |
| 4,750,567 A | * | 6/1988 | Grossmann et al. | 173/13 |
| 5,588,496 A | * | 12/1996 | Elger | 173/178 |
| 6,035,945 A | * | 3/2000 | Ichijyou et al. | 173/48 |
| 6,460,627 B1 | * | 10/2002 | Below et al. | 173/48 |
| 6,666,284 B2 | * | 12/2003 | Stirm | 173/97 |
| 7,070,008 B2 | * | 7/2006 | Baumann et al. | 173/48 |
| 7,287,600 B2 | * | 10/2007 | Braun | 173/48 |
| 7,296,635 B2 | * | 11/2007 | Droste | 173/48 |
| 2004/0003931 A1 | * | 1/2004 | Mueller et al. | 173/90 |
| 2004/0026099 A1 | * | 2/2004 | Stirm | 173/178 |
| 2006/0289181 A1 | * | 12/2006 | Braun | 173/48 |

FOREIGN PATENT DOCUMENTS

| | | |
|---|---|---|
| DE | 42 16 808 | 11/1993 |
| DE | 4216808 A1 * | 11/1993 |
| EP | 0 419 866 | 4/1991 |
| EP | 419866 A2 * | 4/1991 |
| EP | 0 847 837 | 6/1998 |
| GB | 2428757 A * | 2/2007 |
| WO | 89/11955 | 12/1989 |
| WO | WO02/064321 * | 8/2002 |
| WO | WO 2008000545 A1 * | 1/2008 |

* cited by examiner

*Primary Examiner*—Rinaldi I. Rada
*Assistant Examiner*—Michelle Lopez
(74) *Attorney, Agent, or Firm*—Michael J. Striker

(57) ABSTRACT

A clutch device for an electric machine tool that is drivable in a fashion selected from the group consisting of a rotary fashion, a percussion fashion, and both with an impact mechanism deliberately disengageable from or engageable with a spindle that drives a plug-in tool, has an intermediate shaft arranged between the spindle and an armature shaft of a drive motor and configured for transmitting drive energy, the intermediate shaft being axially movable so that the electric machine tool is switchable between operating modes through an axial movement of the intermediate shaft.

6 Claims, 3 Drawing Sheets

CLUTCH DEVICE FOR AN ELECTRIC MACHINE TOOL AND AN ELECTRIC MACHINE TOOL

CROSS-REFERENCE TO A RELATED APPLICATION

The invention described and claimed hereinbelow is also described in German Patent Application DE 10 2005 036 731.3 filed on Aug. 4, 2005. This German Patent Application, whose subject matter is incorporated here by reference, provides the basis for a claim of priority of invention under 35 U.S.C. 119(a)-(d).

BACKGROUND OF THE INVENTION

The invention is based on a clutch device for an electric machine tool as and an electric machine tool.

Rotary hammers and chisel hammers can be used in a variety of operating modes. These types of operation are broken down into rotary drilling, e.g. when drilling into wood and steel, screw driving, stirring etc.; percussion drilling, e.g. when drilling into concrete, stone, etc.; and chiseling, e.g. when removing wall plaster or tiles and when producing openings in walls, etc.

The operating modes are usually produced by means of the mechanical transmission. Rotary drilling is characterized by the impact mechanism being deactivated while the spindle rotates. In percussion drilling, the impact mechanism is added to this spindle rotation. In chiseling mode, the spindle is disengaged from the rotary drive while the spindle is simultaneously locked in position ("spindle lock").

Depending on the structural design of the transmission, an intermediate shaft is supported in stationary fashion by the housing or a flange and the switching occurs by means of components that are slid on the intermediate shaft. The intermediate shaft can also be comprised of several parts and the individual parts can be supported one inside the other so that the individual operating modes are produced by sliding the parts in the axial direction. This does enable a compact, short design, but requires all the forces of the impact mechanism and the torque to be introduced via the intermediate shaft and the bearing.

If the drive end bearing is supported directly in the housing, then it is possible to achieve a rugged, solid construction. This permits the intermediate shaft to then likewise be stationary and the switching to be achieved as described above. If the intermediate shaft is supported so that it can move in the axial direction, then this can be used to execute the switching, but results in a critical structural length and complicates placement of a customarily provided spur gear of the first transmission stage.

SUMMARY OF THE INVENTION

Accordingly, it is an object of the present invention to provide a clutch device for an electric machine tool, as well as an electric machine tool, which eliminates the disadvantages of the prior art.

In keeping with these objects and with others which will become apparent hereinafter, one feature of the present invention resides, briefly stated, in a clutch device for an electric machine tool that is drivable in a fashion selected from the group consisting of a rotary fashion, a percussion fashion, and both with an impact mechanism deliberately disengageable from or engageable with a spindle that drives a plug-in tool, the clutch device comprising an intermediate shaft arrangeable between the spindle and an armature shaft of a drive motor and configured for transmitting drive energy, said intermediate shaft being axially movable so that the electric machine tool is switchable between operating modes through an axial movement of said intermediate shaft.

Another feature of the present invention of the present invention resides, briefly stated, in an electric machine tool, drivable in a fashion selected from the group consisting of a rotary fashion, a percussion fashion, and both, comprising a plug-in tool; a spindle driving said plug-in tool; an impact mechanism deliberately engageable from or engageable with said spindle; and a clutch device, said clutch device including an intermediate shaft arrangeable between the spindle and an armature shaft of a drive motor and configured for transmitting drive energy, said intermediate shaft being axially movable so that the electric machine tool is switchable between operating modes through an axial movement of said intermediate shaft.

With the clutch device according to the present invention, the intermediate shaft is moved in the axial direction in order to switch between operating modes of the electric machine tool. The axial movement of the intermediate shaft can be redirected into a radial function for engaging or disengaging one or more rotary drive connections in which the drive elements of a rotary drive connection can be controlled to produce a transmission of drive energy between the drive unit and the impact mechanism and/or intermediate shaft.

It is possible to combine the principal advantages of a stationary support of a drive end bearing and an axial movement. This makes it possible to achieve a compact, short design and precisely this kind of switching between the various operating modes. At the same time, this makes it possible to avoid the transmission of forces from the impact mechanism to the intermediate shaft.

In a preferred embodiment, an operational connection between the armature shaft and a drive end bearing of the impact mechanism can be engaged or disengaged as a function of an axial position of the intermediate shaft. The axial position can serve to determine the operating mode of the electric machine tool, e.g. for drilling, chiseling, or percussion drilling.

In another favorable embodiment, the intermediate shaft is provided with a constriction; in a corresponding axial position of the shaft, one or more driving elements of a rotary drive connection between the drive end bearing and a toothed sleeve, which is drive-connected to the armature shaft, are able to move into this constriction, thus disengaging the rotary drive connection and therefore the impact mechanism. Because the driving element or elements can move into an empty space provided by the constriction, the intermediate shaft controls the radial position of the driving element or elements. In this position, the drilling mode is engaged and the impact mechanism is disengaged. The driving element or elements can, for example, be embodied in the form of balls.

In another favorable embodiment, an insertion gearing is provided for producing a drive connection between the intermediate shaft and the toothed sleeve. This makes it possible to engage or disengage a rotary drive connection by sliding the intermediate shaft in the axial direction.

In another favorable embodiment, between the constriction and a toothed region of the intermediate shaft associated with the insertion gearing, the intermediate shaft is provided with a region that pins the driving element or elements in position in the rotary drive connection. This makes it possible to assure a transmission of drive energy between the armature shaft and the impact mechanism provided that the intermediate shaft is in such an axial position that the region holds the driving element or elements in its/their driving position. If, for example, the insertion gearing is disengaged, but the driving elements are pinned in position, then this produces the chiseling mode. The spindle is then locked in a suitable fashion.

In another favorable embodiment, the intermediate shaft has a toothed element that is provided for drive connection with the spindle. The toothed element is of a suitable axial length to preserve the operational connection when the intermediate shaft is slid in the axial direction.

In another favorable embodiment, the intermediate shaft can be immobilized by a locking mechanism in order to prevent spindle motion. This position can produce a chiseling mode in which it is undesirable for the spindle to rotate. In this case, it is preferable for the insertion gearing between the intermediate shaft and the toothed sleeve to be disengaged and for the intermediate shaft to pin the driving element or elements in the driving position.

In another favorable embodiment, the intermediate shaft can be slid in the axial direction by means of a control element that can be externally actuated.

In another favorable embodiment, the toothed sleeve is supported in an intermediate flange and/or in the drive end bearing. This makes it possible to achieve a reliable, stable support. It is therefore possible to prevent an introduction of force from the impact mechanism.

The present invention also relates to an electric machine tool in which it is possible to switch between operating modes of the electric machine tool through an axial movement of an intermediate shaft that is situated between a spindle and an armature shaft of a drive motor and is provided to transmit drive energy to the spindle.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
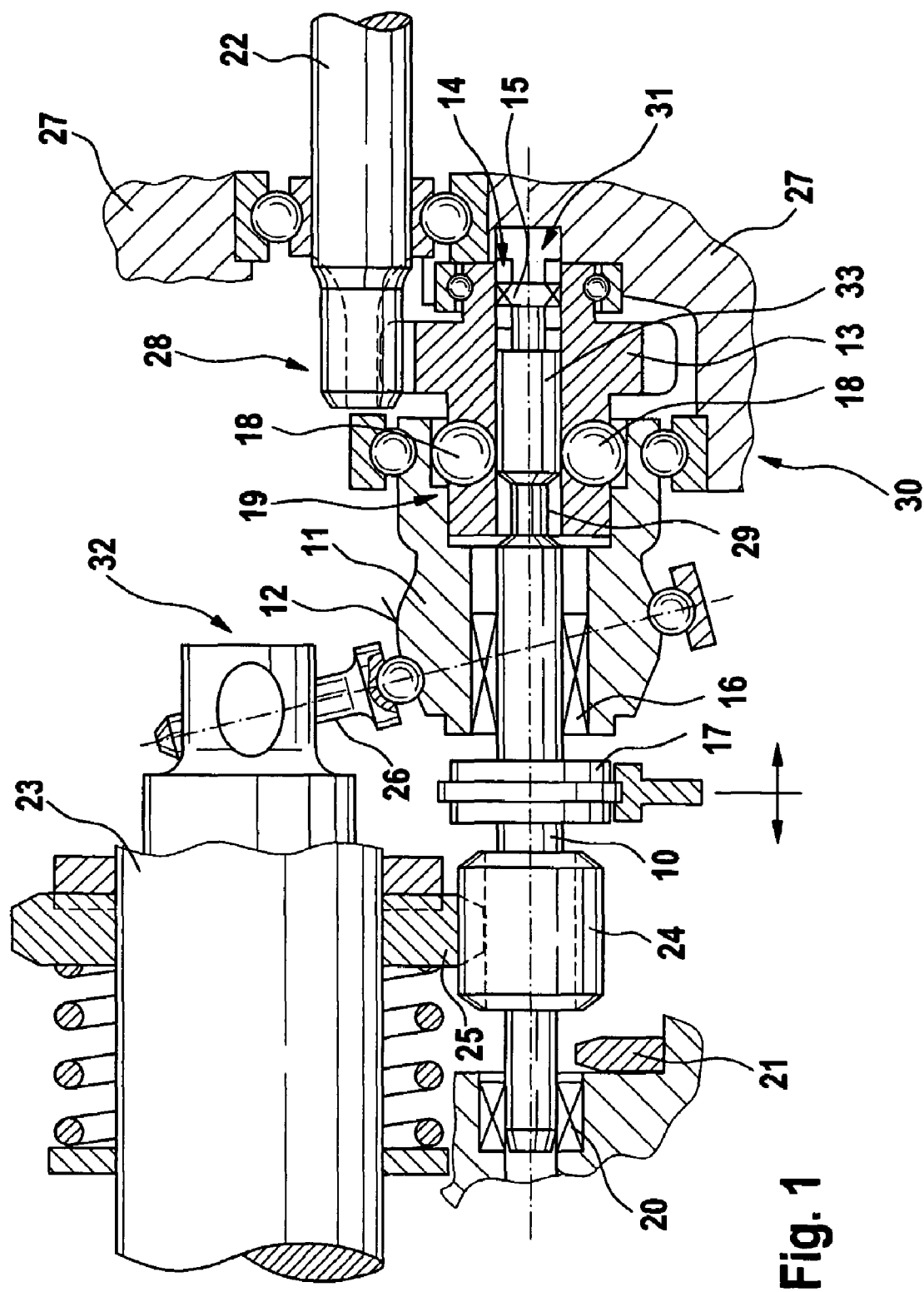
FIG. 1 shows a detail of a transmission region of a preferred rotary hammer in the percussion drilling position.

By way of example, FIG. 1 shows a detail of a rotary hammer transmission of an electric machine tool preferably embodied in the form of a rotary hammer, in a percussion drilling mode.

The preferred clutch device for the electric machine tool equipped with a plug-in tool, not shown, which can be plugged into a spindle 23 and can be driven in a rotary and/or percussive fashion, includes an intermediate shaft 10 and a toothed sleeve 13, having drive elements 18 situated between the toothed sleeve 13 and a drive end bearing 11. The intermediate shaft 10 is situated between the spindle 23 and an armature shaft 22 of a drive motor, not shown. Like the toothed sleeve 13, the armature shaft 22 is supported in an intermediate flange 27.

An impact mechanism 32 can be deliberately engaged with or disengaged from the spindle 23, which drives the plug-in tool, depending on the axial position of the intermediate shaft 10. The electric machine tool is switched between operating modes through an axial movement of the intermediate shaft 10.

At its end oriented toward the intermediate flange 27, the intermediate shaft 10 has an external gearing 15 that forms an insertion gearing 31 together with an internal gearing 14 of the toothed sleeve 13. The insertion gearing 31 constitutes a rotary drive connection between the toothed sleeve 13 and the intermediate shaft 10. An adjacent region 33 of the intermediate shaft 10 has a sufficient diameter in order, in the corresponding axial positions, to pin the drive elements 18, which are secured in the toothed sleeve 13, in their driving position between the drive end bearing 11 and the toothed sleeve 13.

Adjacent to the region 33, the intermediate shaft 10 has a constriction 29 and then, adjoining this constriction 29, widens out again into a bearing region of a bearing 16 in the drive end bearing 11 of the impact mechanism 32. Axially outside the drive end bearing 11, the intermediate shaft 10 has a sliding mechanism 17 that can be actuated externally in order to slide the intermediate shaft 10 in the axial direction. Adjacent to this, a toothed element 24 is rotationally fixed to the intermediate shaft 10 and engages with a gearing 25 of the spindle 23. At its end oriented away from the toothed sleeve 13, the intermediate shaft 10 is supported in a bearing 20.

Disengaged from the toothed element 24, a locking mechanism 21 is provided, which, in the corresponding axial position, can lock the intermediate shaft 10 so that it cannot rotate, thus preventing the spindle 23 from rotating.

The armature shaft 22 transmits its rotary motion to an external gearing of the toothed sleeve 13 by means of a gearing 28. The rotary drive connection 30 between the drive end bearing 11 and the toothed sleeve 13 is provided by means of the driving elements 18. These drive elements are radially encapsulated in the toothed sleeve 13 and are controlled in their radial position by the intermediate shaft 10. A drive profile 19 for the drive elements 18 is provided in the drive end bearing 11.

The drive end bearing 11 of the impact mechanism 32 drives a wobble finger 26, which converts a rotary motion of the drive end bearing 11 into an axial, percussive motion. The wobble finger 26 is supported in the usual way on an outside 12 of the drive end bearing 11.

In the depicted axial position of the intermediate shaft 10, the first rotary drive connection by means of the insertion gearing 31 between the toothed sleeve 13 and the intermediate shaft 10 and the second rotary drive connection 30 between the toothed sleeve 13 and the drive end bearing 11 are activated, thus permitting a rotating, percussive motion of the plug-in tool, e.g. during percussion drilling, in which the first rotary drive connection transmits the rotary motion of the armature shaft 22 to the intermediate shaft 10 and the second rotary drive connection 30 converts the rotary motion of the armature shaft 22 into a hammering motion of the impact mechanism 32.

Figure 2:
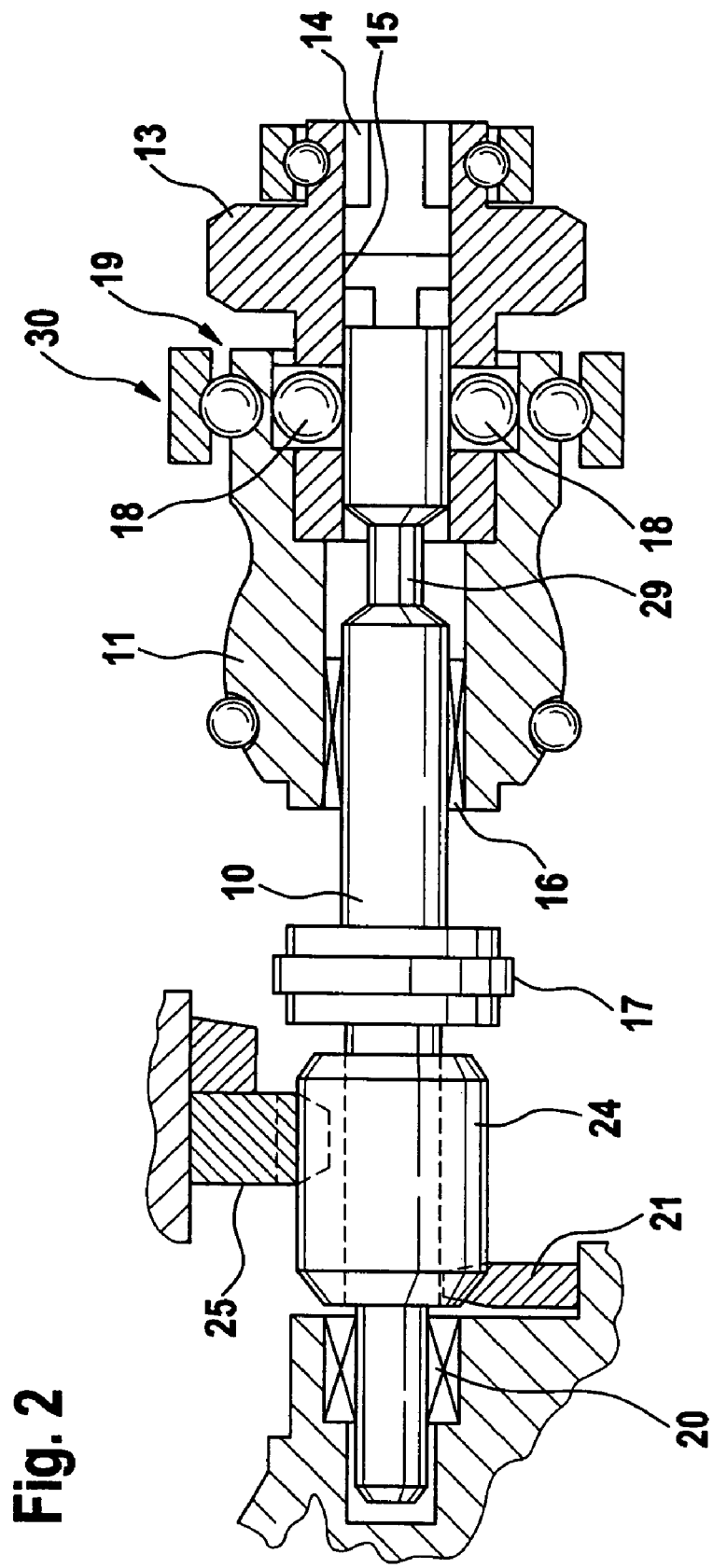
FIG. 2 shows a detail of a transmission region of a preferred rotary hammer according to FIG. 1, in the chiseling position.

FIG. 2 shows the device from FIG. 1 in the chiseling mode. The components have already been described in connection with FIG. 1. The intermediate shaft 10 is slid axially forward toward the plug-in tool. The rotary drive connection 30 between the drive end bearing 11 and the toothed sleeve 13 causes the rotary motion of the armature shaft (not shown) to be transmitted to the drive end bearing 11 and thus generates a percussive motion. In this instance, the region 33 of the intermediate shaft 10 pins the drive elements 18 in position radially, while the rotary drive connection by means of the insertion gearing 31 (FIG. 1) is disengaged and a rotary motion of the armature shaft 22 cannot be transmitted to the intermediate shaft 10. In addition, the toothed element 24 engages with the locking mechanism 21 so that the spindle 23 is prevented from rotating. This allows the rotary motion of the armature shaft to be converted into a purely percussive motion.

Figure 3:
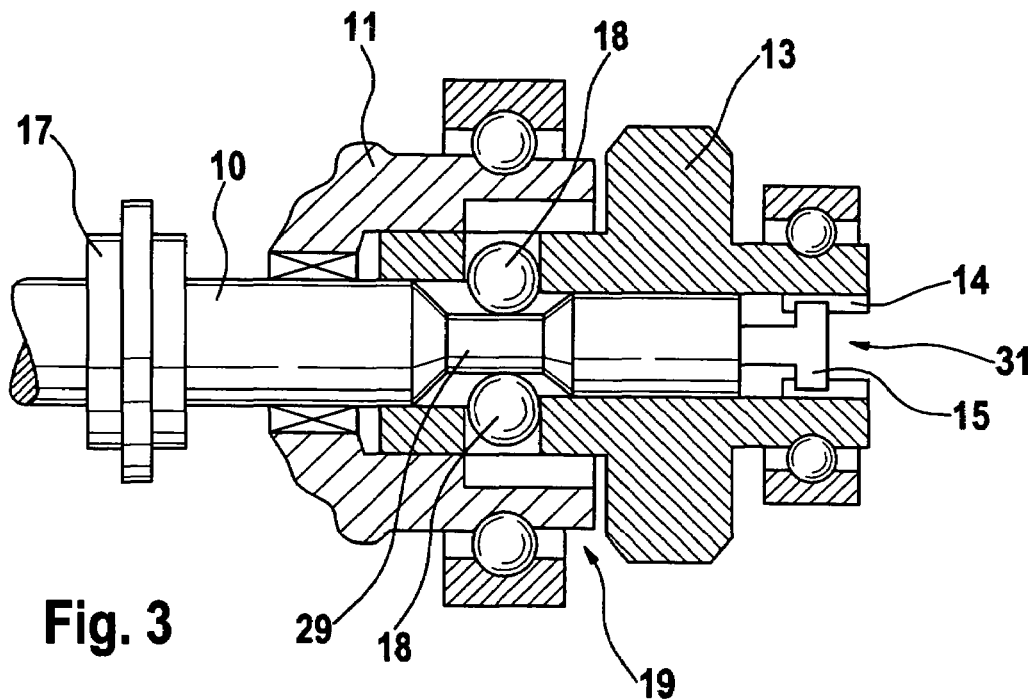
FIG. 3 shows a detail of a transmission region of the preferred rotary hammer according to FIG. 1, in a drilling position.

FIG. 3 shows the device from FIG. 1 in the drilling mode. For drilling, the intermediate shaft 10 is slid rearward axially, away from the plug-in tool. The locking mechanism 21 (FIG. 2) releases the toothed element 24 and the rotary drive connection is produced once more by the insertion gearing 31 between the toothed sleeve 13 and the intermediate shaft 10. But the intermediate shaft 10 is now in an axial position in which the constriction 29 of the intermediate shaft 10 is aligned with the drive elements 18, permitting them to move inward into an empty space constituted by the constriction 29. This disengages the rotary drive connection 30 (FIG. 2) between the toothed sleeve 13 and the drive end bearing 11, disengaging the impact mechanism 32. The rotary motion of the armature shaft 22 (FIG. 1) is now converted into a purely rotary motion of the plug-in tool for rotary drilling.

Figure 4B:
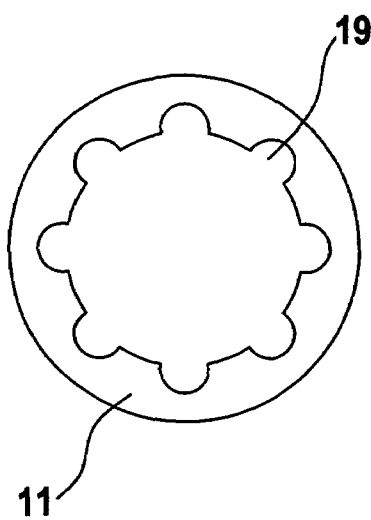
FIGS. 4a, b show a section through a drive end bearing (FIG. 4a) and a top view of an end surface of the drive end bearing provided with a drive profile (FIG. 4b).
Figure 4A:
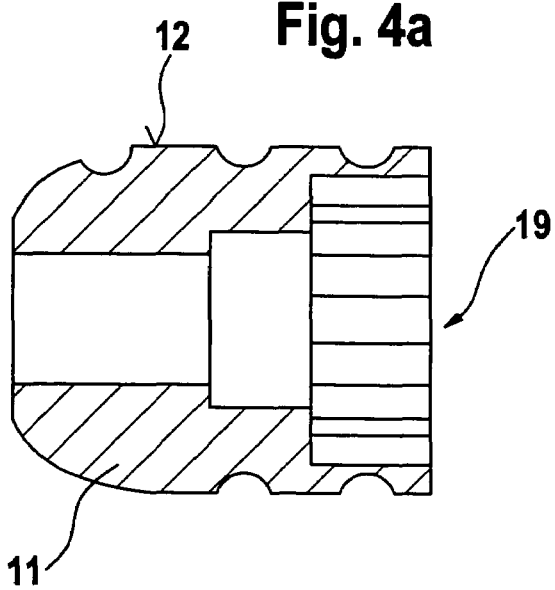

FIG. 4*a* is a section through a drive end bearing 11, showing a drive profile 19 for drive elements at one end of the drive end bearing 11. FIG. 4*b* shows a top view of the drive profile 19 of the drive end bearing 11.

It will be understood that each of the elements described above, or two or more together, may also find a useful application in other types of constructions differing from the types described above.

While the invention has been illustrated and described as embodied in a clutch device for an electric machine tool and an electric machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A clutch device for an electric machine tool that is drivable in a fashion selected from the group consisting of a rotary fashion, a percussion fashion, and both with an impact mechanism deliberately disengageable from or engageable with a spindle that drives a plug-in tool, the clutch device comprising an intermediate shaft arrangeable between the spindle and an armature shaft of a drive motor and configured for transmitting drive energy, said intermediate shaft being axially movable so that the electric machine tool is switchable between operating modes through an axial movement of said intermediate shaft, wherein said intermediate shaft has a constriction; and further comprising at least one driving element of a rotary drive connection between a drive end bearing and a toothed sleeve which is drive-connected to the armature shaft, said at least one driving element being configured so that in a corresponding axial position of said intermediate shaft it is movable into said constriction, thus disengaging the rotary drive connection; and an insertion gearing provided between the intermediate shaft and the toothed sleeve to produce the drive connection, wherein said intermediate shaft has a region which is provided between the constriction and a tooth region of said intermediate shaft associated with said insertion gearing and which holds said at least one driving element in position in the rotary drive connection.

2. A clutch device as defined in claim 1, wherein said intermediate shaft is configured so that an operational connection between the armature shaft and a drive end bearing of the impact mechanism is engageable or disengageable as a function of an axial position of said intermediate shaft.

3. A clutch device as defined in claim 1, wherein said intermediate shaft has a toothed element that is configured for drive connection with the spindle.

4. A clutch device as defined in claim 1; and further comprising a locking mechanism immobalizing said intermediate shaft in order to prevent a motion of the spindle.

5. A clutch device as defined in claim 1; and further comprising a control element configured so that is externally actuatable and slides said intermediate shaft in an axial direction.

6. A clutch device as defined in claim 1; and further comprising a supporting element selected from the group consisting of an intermediate flange and the drive end bearing and supporting said toothed sleeve.

* * * * *